United States Patent [19]
Guillory et al.

[11] 3,856,750
[45] Dec. 24, 1974

[54] POLYOLEFINS STABILIZED WITH NICKEL OR COBALT COMPLEXES OF HALOGENATED MONO OR DITHIO BETA DIKETONES

[75] Inventors: Jack P. Guillory, Bartlesville, Okla.; Ronald D. Mathis, Taylors, S.C.

[73] Assignee: Phillips Petroleum Company, Bartlesville, Okla.

[22] Filed: Oct. 31, 1973

[21] Appl. No.: 411,455

[52] U.S. Cl.... 260/45.75 N, 260/45.75 R, 260/439 R, 260/590, 260/593 R, 260/607 C
[51] Int. Cl. .......................................... C08f 45/62
[58] Field of Search ................. 260/45.75 N, 607 C

[56] References Cited
UNITED STATES PATENTS

| | | | |
|---|---|---|---|
| 3,692,738 | 9/1972 | Mathis et al. | 260/45.85 |
| 3,763,092 | 10/1973 | Mathis et al. | 260/45.75 |

Primary Examiner—V. P. Hoke
Attorney, Agent, or Firm—Neuman, Williams, Anderson & Olson

[57] ABSTRACT

Polyolefin resin compositions having improved ultra violet and thermal stability properties are obtained by incorporating with the resins small amounts of a cobalt or nickel complex of a partially halogenated mono or dithio beta diketone.

5 Claims, No Drawings

POLYOLEFINS STABILIZED WITH NICKEL OR COBALT COMPLEXES OF HALOGENATED MONO OR DITHIO BETA DIKETONES

This invention relates to improvement of polyolefins. More particularly, the invention relates to improving ultraviolet stability of polyolefins.

It is known that polyolefin materials such as polyethylene, normally solid polymers of propylene and similar polymers are subject to deterioration due to exposure to sunlight or ultraviolet radiation with the result that the polyolefin resins become discolored, brittle and lose their extensibility or strength.

Attempts have heretofore been made to overcome such undesirable deterioration by incorporation with polyolefins of stabilizing additives or a combination of stabilizers. Many of the proposed additives, while satisfactory in one or more respects, exhibit certain disadvantages such as less than complete compatibility with the resins or a tendency to adversely affect the color of the products.

It is a principal object of this invention to provide polyolefin compositions containing small amounts of stabilizing additives with the resulting composition having greatly improved ultraviolet radiation stability.

The foregoing object as well as others is accomplished by incorporating with a polyolefin a relatively small stabilizing amount of a nickel or cobalt complex of a mono or dithio-beta diketone of the formula:

$$X_3C-\underset{\underset{Z}{\parallel}}{C}-CH_2-\underset{\underset{S}{\parallel}}{C}-R$$

wherein:
  $Z$ = oxygen or sulfur,
  $X$ = fluorine, chlorine, bromine or iodine, and
  R is a hydrocarbyl radical selected from alkyl, aryl and cycloalkyl radicals and combinations thereof such as alkaryl, aralkyl, alkylcycloalkyl and the like containing from 1 to 18 carbon atoms, more preferably 1 to 12 carbon atoms.

Exemplary mono and dithio-beta diketones* include:

$CF_3\underset{\underset{O}{\parallel}}{C}CH_2\underset{\underset{S}{\parallel}}{C}CH_2CH_2CH(CH_3)_2$ — 1,1,1-trifluoro-7-methyl-4-thioxo-2-oxooctane $CCl_3\underset{\underset{O}{\parallel}}{C}CH_2\underset{\underset{S}{\parallel}}{C}CH_3$ — 1,1,1-trichloro-4-thioxo-2-oxopentane $CF_3\underset{\underset{O}{\parallel}}{C}CH_2\underset{\underset{S}{\parallel}}{C}(CH_2)_{11}CH_3$ — 1,1,1-trifluoro-4-thioxo-2-oxohexadecane $CF_3\underset{\underset{O}{\parallel}}{C}CH_2\underset{\underset{S}{\parallel}}{C}-$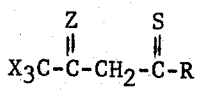 — 1,1,1-trifluoro-4-phenyl-4-thioxo-2-oxobutane $CF_3\underset{\underset{O}{\parallel}}{C}CH_2\underset{\underset{S}{\parallel}}{C}-$⟨ ⟩$CH_3$ — 1,1,1-trifluoro-4-(4-methylcyclohexyl)-4-thioxo-2-oxobutane $CF_3\underset{\underset{S}{\parallel}}{C}CH_2\underset{\underset{S}{\parallel}}{C}CH_2CH_3$ — 1,1,1-trifluoro-2,4-hexanedithione $CF_3\underset{\underset{S}{\parallel}}{C}CH_2\underset{\underset{S}{\parallel}}{C}CH_2CH_2CH_2CH_3$ — 1,1,1-trifluoro-2,4-nonanedithione Nickel and cobalt derivatives of the above mono and dithio-beta diketones are formed by reacting solutions of an appropriate metal compound (i.e. nickel acetate, cobaltous acetate, etc.) and the diketone and finally isolating the product by filtering, extraction, etc. Solvents in which both reactants are soluble, such as alcohol, are preferable. A two-phase solvent system may also be used. The diketone is dissolved in an organic solvent, such as an ether, and the metal compound dissolved in water. The two solvent phases are shaken or stirred together vigorously, the reaction occurring interfacially. The product is isolated from the organic phase by evaporation of the solvent. Further purification can be accomplished by normal methods. Examples of the nickel and cobalt derivatives include: bis(1,1,1-trifluoro-7-methyl-4-thiolooct-3-en-2-one)nickel(II), bis(1,1,1-trifluoro-4-thiolopent-3-en-2-one)cobalt(II), bis(1,1,1-trichloro-2,4-hexanedithionato)nickel(II), bis(1,1,1-tribromo-2,4-dodecanedithionato)nickel(II), bis(1,1,1-trifluoro-4-phenyl-4-thiolobut-3-en-2-one)cobalt(II), bis(1,1,1-trifluoro-4-methylcyclohexyl-4-thiolohept-3-en-2-one)nickel(II) and the like.

The discovery of this invention is generally applicable to the stabilization of homopolymers and copolymers of 1-olefins containing from 2 to 8 carbon atoms per molecule. Examples of such include polyethylene, polypropylene, poly(1-butene), poly(4-methylpentene-1), propylene/ethylene copolymers, ethylene/1-butene copolymers, ethylene/1-hexene copolymers, ethylene/1-octene copolymers and the like and mixtures thereof. When the polyolefin is polypropylene, it is preferable to include in the composition a minor amount of an antioxidant to provide heat stability during processing.

Suitable antioxidants (heat stabilizers) to admix with the compositions are hindered phenols selected from the group consisting of 2,6-di-t-butyl-4-methylphenol, tetrakis-[methylene(3,5-di-t-butyl-4-hydroxyhydrocinnamate)]methane, octadecyl[3-(3,5-di-t-butyl-4-hydroxyphenyl)]propionate, di-n-octadecyl(3,5-di-t-butyl-4-hydroxybenzyl)phosphonate, 1,3,5-trimethyl-

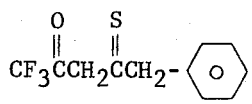 - 1,1,1-trifluoro-5-phenyl-4-thioxo-2-oxopentane

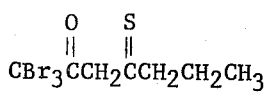 - 1,1,1-tribromo-4-thioxo-2-oxoheptane

\* These compounds, although shown in ketonic form, also may exist in equilibrium with the corresponding enolic form.

2,4,6-tris(3,5-di-t-butyl-4-hydroxybenzyl)-benzene, 2,- 2'-methylenebis(6-t-butyl-4-methylphenol) and the like.

The cobalt or nickel ultraviolet stabilizers are employed in the polyolefin compositions in accordance with this invention in relatively small amounts, ranging from about 0.005 to about 5.0 parts per 100 parts polymer by weight (PHP) and preferably from about 0.1 to about 2.0 PHP. When the antioxidants are employed, as in the case of polypropylene, they are employed in amounts of from about 0.005 to about 2.5 parts per 100 parts of the polymer by weight (PHP) and preferably from about 0.02 to about 1.0 PHP.

The additives are admixed with the polymers utilizing conventional means such as by tumbling powders, solutions or slurries of the additives with resin powder or pellets or by more intensive mixing such as in a Henschel mixer. The resulting blends are dried, if necessary, and further mixed on a roll mill, Banbury mixer, Brabender Plastograph, extruder and the like to distribute the additives in the molten polymers. Following such mixing the resulting blends are normally extruded and pelletized.

Other additives can be admixed with the compositions such as pigments, dyes, antistatic agents, fillers, processing aids, other stabilizers such as diesters of beta, beta'-thiodipropionic acid (i.e. dilaurylthiodipropionate, distearylthiodipropionate, etc.) and the like providing no antagonistic reaction occurs with the stabilizing additives used in the compositions.

The advantages of the invention are further illustrated by the following specific examples.

EXAMPLE I

1. Preparation of 1,1,1-trifluoro-7-methyl-4-mercaptooct-3-en-2-one (ketonic form is 1,1,1-trifluoro-7-methyl-4-thioxo-2-oxooctene).

In a 2-liter, 3-necked, round-bottomed flask, fitted with a mechanical stirrer, thermometer and gas dispersion tube were placed 37.5 grams (0.178 mol) of 1,1,1-trifluoro-7-methyl-2,4-octanedione and 1500 milliliters of absolute ethanol. The flask was cooled in an acetone/carbon dioxide bath and hydrogen sulfide was bubbled through the stirred solution for 40 minutes, followed by dry hydrogen chloride for an additional 40 minutes. The temperature of the reaction mixture was maintained at −50° to −65° C. during the addition and then allowed to warm to room temperature over a 4 hour period. The orange solution was then allowed to stand at 25° C. under a nitrogen atmosphere for 3 days.

The reaction mixture was diluted with 400 milliliters of ice water and extracted 4 times with 400 milliliter portions of n-pentane. The pentane extracts were combined, washed with water, dried over magnesium sulfate, filtered and concentrated on a rotary evaporator to give 39.8 grams of a red liquid: b.p. 66–68° C at 2.0 mm pressure; IR (neat), 1690 (ketone), 1560 (enol) cm$^{-1}$; mass spectrum molecular ion m/e 226, also ions of 170 (M-C$_4$H$_8$) and 101 (S=C$^+$-CH$_2$C(OH)CH$_2$).

Analysis: Calculated for C$_9$H$_{13}$F$_3$OS: C, 47.9; H, 5.8; S, 14.2.

Found: C, 48.5; H, 5.3; S, 13.3.

2. Preparation of bis[1,1,1-trifluoro-7-methyl-4-thiolooct-3-en-2-one]nickel(II).

Nickel acetate tetrahydrate (11.0 grams, 0.004 mol) in 1 liter of hot absolute ethanol was added to undistilled 1,1,1-trifluoro-7-methyl-4-mercaptooct-3-en-2-one prepared in part 1 (30.0 grams, 0.133 mol) contained in 140 milliliters of absolute ethanol with stirring. The resulting dark brown solution was allowed to cool and stand at 25° c. for 20 hours. Water (700 milliliters) was added to the solution and the mixture was cooled in an ice bath. Crystals separated and they were filtered off and washed with water to give 23.8 grams of product. Recrystallization from ethanol-water (350:50 milliliters) gave 13.2 grams of red-brown needles: m.p. 76–77.5°C.; IR (KBr), 1550 (C=C), 1530 (C=O), 1300, 1200, 817 (C=S) cm$^{-1}$.

Analysis: Calculated for C$_{18}$H$_{24}$F$_6$O$_2$S$_2$Ni: C, 42.5; H, 4.76; F, 22.4; S, 12.6; Ni, 11.54.

Found: C, 42.2; H, 4.23; F, 22.3; S, 11.8; Ni, 11.4.

EXAMPLE II

Polypropylene compositions containing ultraviolet stabilizers and antioxidants were prepared by blending the stabilizers with molten 3 melt flow (ASTM D1238–62T, condition L) polypropylene by means of a Brabender Plastograph. To provide processing stability during mixing, to each blend was also added 0.1 php tetrakis[methylene(3,5-di-t-butyl-4-hydroxyhydrocinnamate)]methane and 0.2 php distearyl thiodipropionate. The blends were mixed for 5 minutes at 200° C. under nitrogen. Samples of 2 mils, 5 mils and 20 mils in thickness were compression molded from each molten blend. Specimens one-half inch wide and 3 inches long were cut from the molded samples and exposed in a black light/sunlamp device and in a "sunshine" carbon arc Weather-Ometer manufactured by Atlas Electric Devices Company. The black light/sunlamp device consists of ten 20-watt fluorescent sunlamps and ten 20-watt black light fluorescent tubes arranged vertically in a circle in alternate fashion to form a central core. The tubes are about 1 inch apart. A rotatable jacket (no top or bottom) surrounds the core and the samples are mounted on the inside of the jacket so that the distance between samples and lights is about 3 inches.

The specimens are manually flexed daily in a 180° rolling bend test. Failure is indicated by breaking, and time to failure is the average of 5 specimens.

Thermal stability was determined by placing a ⅜ inch × 1½ inch specimen cut from each of the 20 mil sheets into a test tube having a hole in the bottom to allow free circulation of air. The tubes were placed in an air oven maintained at 150° C. Failure is recorded as the time in days required to sufficiently embrittle a specimen so that it breaks when it is bent.

Table II

| Run | UV Stabilizer | Hours on test | Tensile Strength, psi | Elongation % |
|---|---|---|---|---|
| 9 | invention | 0 | 3850 | 41 |
| 10 | do. | 1000 | 4000 | 30 |
| 11 | do. | 2000 | 4000 | 16 |
| 12 | do. | 2750 | 4000 | 12 |
| 13 | do. | 4000 | 4000 | 10 |
| 14 | comparison | 0 | 3950 | 44 |
| 15 | do. | 1000 | 4000 | 30 |
| 16 | do. | 2000 | 3750 | 10 |
| 17 | do. | 2750 | 3650 | 10 |
| 18 | do. | 4000 | 3450 | 8 |

The results show that samples containing the invention ultraviolet stabilizer and the comparison stabilizer have not failed after an exposure time of 2,750 hours. Inspection of the elongation values after 2,750 hours and 4,000 hours show that the invention stabilizer is providing somewhat greater protection than the comparison stabilizer since embrittlement is proceeding at a slower rate.

Those modifications and equivalents which fall

Table I

| UV stabilizer, php | | Run | Hours to Failure BL/SL 2 mil | Hours to Failure BL/SL 5 mil | Hours to Failure BL/SL 20 mil | Weather-Ometer 20 mil | Thermal stability, 150° C., 20 mil, days |
|---|---|---|---|---|---|---|---|
| control | 0 | 1 | 99 | 149 | 166 | 154 | 49 |
| invention[a] | 0.1 | 2 | — | — | 303 | 523 | 59 |
| | 0.2 | 3 | 275 | — | 822 | 678 | 57 |
| | 0.25 | 4 | — | 704 | — | — | — |
| | 0.5 | 5 | — | 1696 | — | — | — |
| comparison[b] | 0.1 | 6 | 141 | — | 214 | 376 | 35 |
| | 0.2 | 7 | 220 | — | 349 | 558 | 20 |
| | 0.25 | 8 | — | 365 | — | — | — |
| | 0.5 | 9 | — | 492 | — | — | — |

[a] bis[1,1,1-trifluoro-7-methyl-4-thiolooct-3-en-2-one]nickel(II)
[b] (2,2-thiobis-[4-t-octylphenolato])-n-butylamine nickel(II)

Inspection of the results clearly shows the invention stabilizer provides significantly more protection to the polymer than a commercially available nickel-containing ultraviolet stabilizer used as a comparison. The invention stabilizer also adds additional thermal stability to the compositions whereas the comparison ultraviolet stabilizer adversely affects thermal stability of the compositions containing it.

EXAMPLE III

An ethylene/1-butene copolymer characterized by possessing a melt index of about 1.2 (ASTM D1238–62T, condition E) and a density of about 0.950 g/cc (ASTM D1505–63T) was mixed with 0.2 php 2,6-di-t-butyl-4-methylphenol as the antioxidant and 0.5 php of the ultraviolet stabilizer. The same ultraviolet stabilizers were used as in Example II. The blends were compression molded into bars 60 mils thick, one-half inch wide and 6 inches long. The bars were exposed in a carbon arc Weather-Ometer until failure as recorded in hours occurred. Failure is determined by pulling each specimen in an Instron Tester until the initial tensile strength decreases to about one-third of the original value or the percent elongation drops to less than about 10 percent. The results are given in Table II.

within the spirit of the invention are to be considered a part thereof.

what is claimed is:

1. A polyolefin composition having admixed therewith in an amount to impart thermal and ultraviolet light stability to the composition a nickel or cobalt complex of a mono or dithio-beta diketone of the formula:

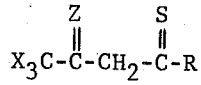

wherein
Z = oxygen or sulfur,
X = fluorine, chlorine, bromine or iodine, and
R is a hydrocarbyl radical selected from alkyl, aryl and cycloalkyl radicals and combinations thereof containing from 1 to 18 carbon atoms.

2. A composition in accordance with claim 1 wherein the said stabilizing compound is present in an amount from about 0.005 to about 5.0 parts by weight per 100 parts by weight of the polyolefin.

3. A composition in accordance with claim 1 wherein the polyolefin is polyethylene.

4. A composition in accordance with claim 1 wherein the polyolefin is polypropylene.

5. A composition in accordance with claim 4 which contains heat stabilizing antioxidants.

* * * * *

UNITED STATES PATENT OFFICE
CERTIFICATE OF CORRECTION

Patent No. 3,856,750          Dated December 24, 1974

Inventor(s) Jack P. Guillory and Ronald D. Mathis

It is certified that error appears in the above-identified patent and that said Letters Patent are hereby corrected as shown below:

On the first page of the patent, second column, in the second line of the Abstract, after "violet" insert -- light --

Column 4, line 5, after "1,1,1-tribromo-4-thioxo-2-oxoheptane" insert -- and the like -- line 40, "25° c." should be -- 25° C. -- lines 46-52 should follow line 54.

line 53, "(C=C)" should be -- (C≡C) -- line 54, "(C=O)" should be -- (C═O) -- line 54, "(C=S)" should be -- (C═S) --

Column 5, line 55, "0.2" should be -- 0.02 --

Column 6, line 41, "what is claimed is:" should be -- WHAT IS CLAIMED IS: -- line 45, "comlex" should be -- complex --

Signed and sealed this 8th day of April 1975.

(SEAL)
Attest:

RUTH C. MASON
Attesting Officer

C. MARSHALL DANN
Commissioner of Patents
and Trademarks